H. CARHARTT, H. CARHARTT, Jr. & O. E. KRATZ.

OVERALLS.

APPLICATION FILED APR. 17, 1916.

Reissued May 23, 1916. 14,135.

2 SHEETS—SHEET 1.

Inventors

Hamilton Carhartt,
Hamilton Carhartt, Jr.,
and Oscar E. Kratz.

By Redfield & Dodkitte

Attorneys

H. CARHARTT, H. CARHARTT, Jr. & O. E. KRATZ.

OVERALLS.

APPLICATION FILED APR. 17, 1916.

Reissued May 23, 1916. 14,135.

2 SHEETS—SHEET 2.

Inventors

Hamilton Carhartt,
Hamilton Carhartt Jr.
and Oscar E. Kratz,

By Bradford & Doolittle,

Attorneys

UNITED STATES PATENT OFFICE.

HAMILTON CARHARTT, HAMILTON CARHARTT, JR., AND OSCAR E. KRATZ, OF DETROIT, MICHIGAN, ASSIGNORS TO HAMILTON CARHARTT, MANUFACTURER, OF DETROIT, MICHIGAN, A CORPORATION OF MICHIGAN.

OVERALLS.

14,135. Specification of Reissued Letters Patent. Reissued May 23, 1916.

Original No. 1,152,289, dated August 31, 1915, Serial No. 873,234. Application for reissue filed April 17, 1916. Serial No. 91,580.

*To all whom it may concern:*

Be it known that we, HAMILTON CARHARTT, HAMILTON CARHARTT, Jr., and OSCAR E. KRATZ, citizens of the United States, residing at Detroit, Wayne county, and State of Michigan, have invented and discovered certain new and useful Improvements in Overalls, of which the following is a specification.

Our said invention consists in certain improvements in the details of construction and arrangement of parts of workmen's overalls, whereby such a garment is provided of special durability and wear resisting qualities at points commonly under the greatest strain in use and where such garments most frequently rip or tear, or wear out, all as will be hereinafter more fully described and claimed.

Figure 1:
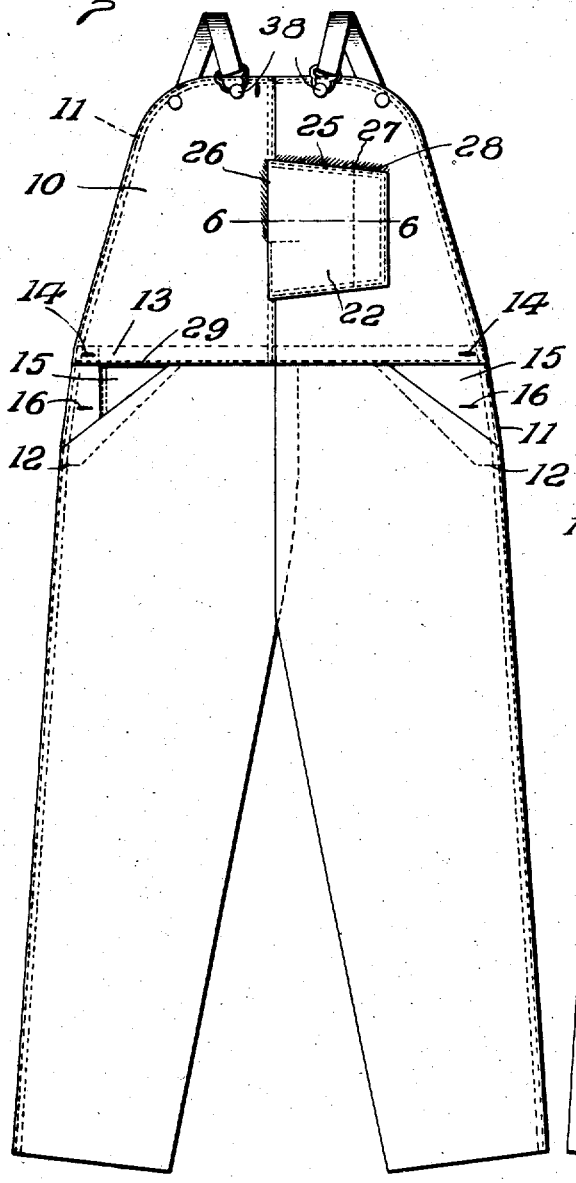
Figure 2:
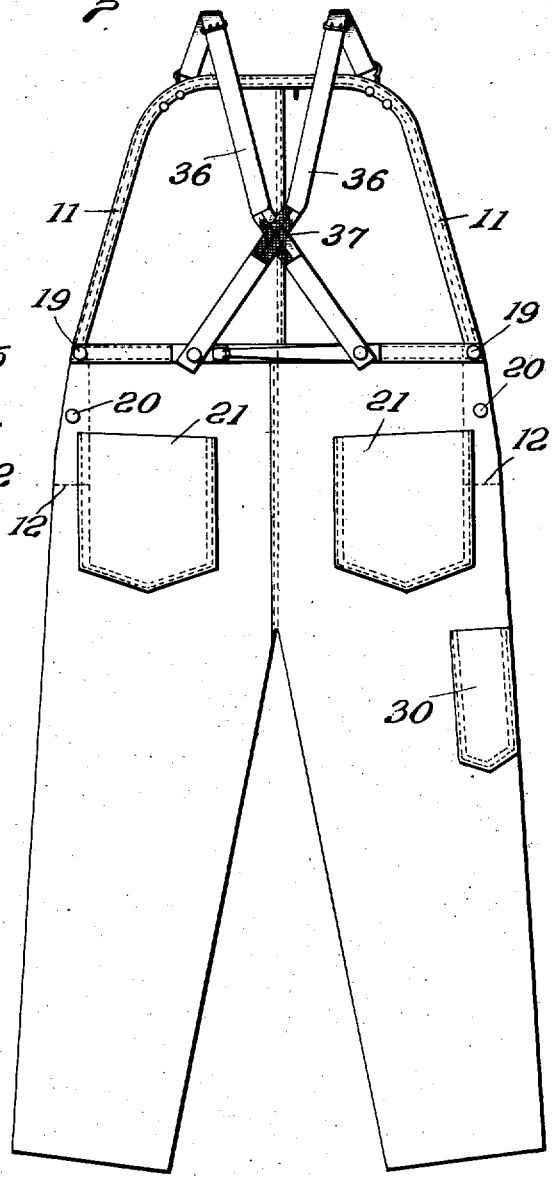
Figure 6:
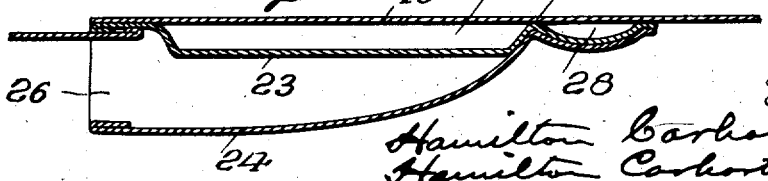
Figure 3:
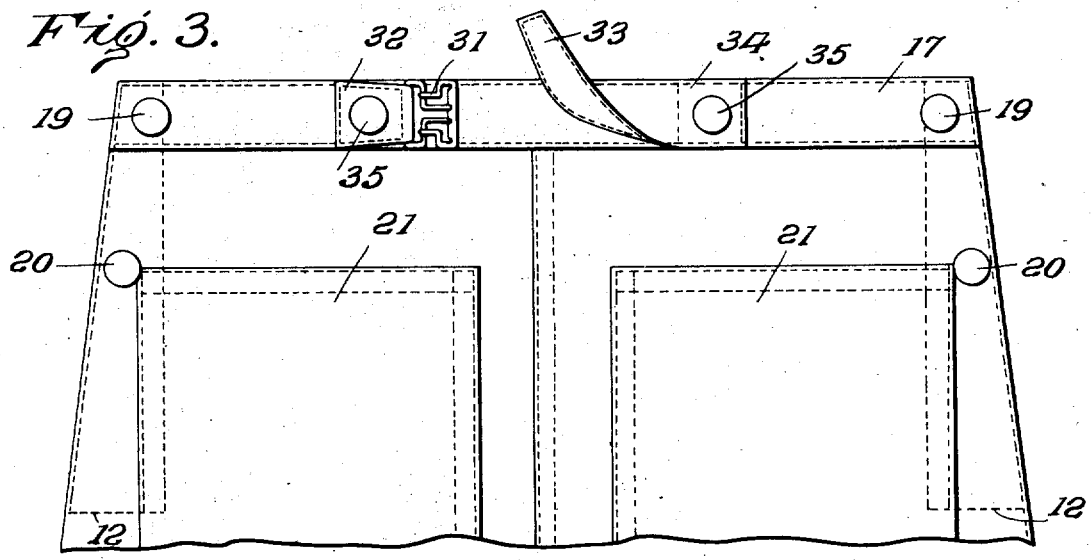
Figure 4:
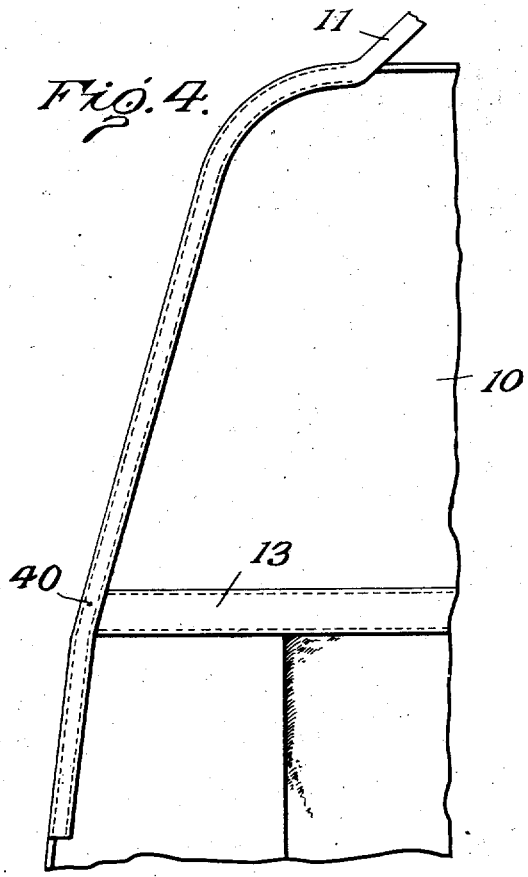
Figure 5:
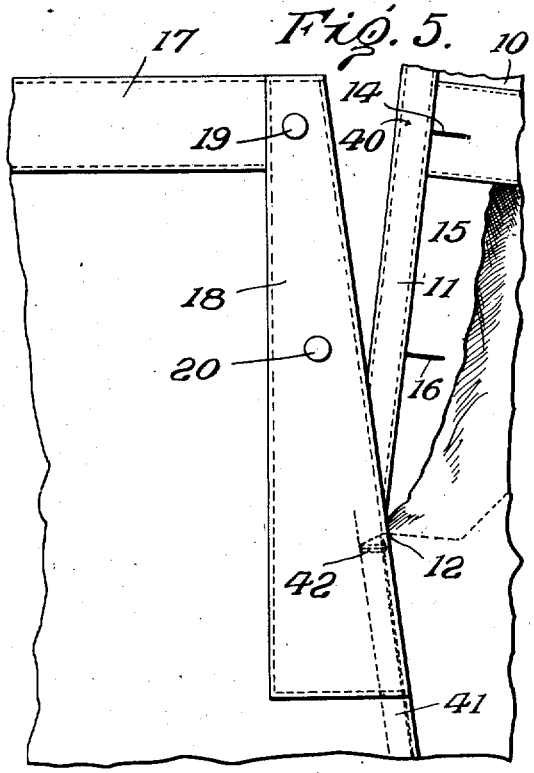

Referring to the accompanying drawings, which are made a part hereof and on which similar reference characters indicate similar parts, Figure 1 is a front elevation of a pair of overalls of our improved construction. Fig. 2 a rear elevation, Fig. 3 a detail rear elevation, showing the waist band and the adjusting strap, and also the facing and pocket constructions, on a larger scale. Fig. 4 a detail view of one side of the bib construction, Fig. 5 a detail inside view showing the construction at one of the side openings, and Fig. 6 a detail section on the dotted line 6—6 in Fig. 1.

In the main, or general form, the overalls are cut substantially in the usual manner. The bib 10 is bound around the edge by having its edge turned-in and a facing strip 11 attached thereto, said facing strip extending continuously from a point below the juncture of the seams at the side openings, as at point 12, on each side, around the edge of said bib. Said facing strip is secured, as indicated most clearly in Fig. 4, by a double row of stitching formed by a continuous operation on a two-needle sewing machine. The waist band 13 across the front of the overall extends from edge to edge and is stitched to the top, forming the juncture between the bib 10 and the front portion of the overalls before the facing strip 11 is put on. Said facing strip 11 passes over the outside of said band 13 at its ends and binds said ends securely to the goods, making a smooth and continuous binding at points 40. Buttonholes 14 are formed at the ends of said bands 13 just at the inner edge of said facing strip 11. By this means the button-holes are stayed securely and prevented from giving under the strain, as will be seen. The front pockets 15 have their openings at the side top corners of the front part of the garment and extend down inside and are secured at their outer edges under the facing strip 11 and also with double seams forming the juncture at point 12. The lower side button-holes 16 are formed through the goods comprising the pocket, as well as the goods comprising the front of the overalls, and these button-holes, as well as the button-holes 14, are thus likewise stayed and supported by the binding or facing strip 11.

The rear section of the overalls is also provided with a waist band 17 and the side openings are faced by facing strips 18. Said waist band 17 extends from edge to edge of the rear section and the facing strips 18 extend to the top covering the ends of said waist band and forming extra reinforced corners for the support of the buttons 19. Other buttons 20 are secured lower down on the reinforced edge, being supported by said facing strip 18, as well as the goods of which the overalls are made. Said buttons 19 and 20 on the edges of the rear section of the overalls are adapted to engage with the button holes 14 and 16, respectively, in the edges of the front section of the overalls. The hip pockets 21 are also secured at their outer edges by stitching which extends through the facing strips 18, thus affording a strong support for these edges at points where they frequently tear and are subjected to the most strain.

As the facing strips 11 on the side edges of the front section of the overalls extend to a point below the juncture, at point 12, at the bottom of the side openings, and as the facing strips 18 on the side edges of the rear section also extend below this point, and as the edge of the front pockets 15 are attached under the facing strip 11 and also extend to below the point 12, it will be seen that these side junctures are very securely reinforced and strengthened and at the same time without any additional labor or expense, inasmuch as the double row of stitching up the side seam 41 continues to a point above said point 12 and passes through the several thicknesses of goods and with the extra staying cross stitches 42, at said point 12, effect a very secure construction adapted to withstand any ordinary strain and thus guard against ripping or tearing at this point, which is commonly one of the first to give way in this character of garment. It will be understood, of course, that the facing strip 11 may be in one piece, or separate pieces appropriately secured together.

A multiple pocket 22 is mounted on the bib 10 formed of two sections of goods 23 and 24 having a top opening at 25 leading into one pocket, a side opening 26 leading into another pocket, and a row of vertical stitches at 27 separating one side of the pocket into a pencil pocket 28 at the edge, thus forming three pockets in said bib. One of the front pockets 15 is also formed double with a small pocket opening as at 29. Another rear pocket 30 for carpenter's rule, or like use, is provided, thus providing nine pockets for various uses, constituting receptacles for various materials and tools used by the workmen.

A buckle 31 is mounted on the rear waist band 17 by means of a double strap 32 securely sewed to said waist band, and a short distance on the other side of the center, in a like manner, a strap 33 is attached adapted to be used with said buckle for tightening or adjusting said waist band. The reinforced sections 32 and 34 of the rear waist band, thus formed, are utilized for button supports for the rear suspender buttons 35, thus affording an ample base or support for the buttons to be riveted to and enabling them to be secured in a very substantial manner.

Suspenders 36 with interlaced elastic sections in the back at 37, are provided and attached to the buttons 35 in the rear, and buttons 27 on the front top edge of the bib as is usual.

By this construction a garment of the character described is provided of exceptionally enduring qualities, and also one wherein the edges and juncture points are neatly and attractively finished, as well as rigidly and securely reinforced and stayed. These improvements are secured by the features of construction above described and without materially adding to the expense of manufacture.

Having thus fully described our said invention what we claim as new, and desire to secure by Letters Patent is:

1. A garment of the character described having a bib the edge of which is reinforced by a facing strip extending continuously from a point below the juncture of the side openings in the garment entirely around the outer edge of said bib and secured thereto by stitching, the lower ends of said facing strip being secured in the seam which joins the two parts of the garment at the lower end of its side openings, substantially as set forth.

2. A garment of the character described comprising a bib secured to the front section of the garment, a waist-band extending from edge to edge thereof and secured at the juncture of the bib with the body part of the garment, the edge of said bib being bound by having its edge inturned and a facing strip secured to the inner face covering said inturned edge and extending continuously from a point within the seam joining the side opening in the garment on one side to a point within the seam joining the side opening on the opposite side, said facing strip covering the ends of said waist-band of the front section of the garment and being secured in position by continuous stitching from one side to the other, substantially as set forth.

3. A garment of the character described comprising a front section having a bib thereon, said bib being reinforced at its edge by a facing strip extending across the juncture of the bib with the main body of the garment down into the seam forming the juncture between the two sides of the body of the garment, another facing strip secured to each edge of the rear section of the body of the garment, said facing strips of the rear section and said facing strip of the bib section overlapping each other and meeting in the seam forming the juncture between the two sections at the lower end of the side openings in the garment, substantially as set forth.

4. A pair of overalls formed with side openings extending a distance below the waist line and formed by terminating the seam joining the front and rear body sections at the desired distance below said waist line, a separate reinforcing facing strip stitched to the edge of each section and extending across the ends of the waist bands of the respective sections and at their lower ends extending below the point of juncture and included in the seam forming said juncture, whereby a very strong connection between the front and rear sections is formed at said juncture, and the corners of the front and rear sections at the waist band are reinforced to afford strong corners and firm supports for the buttons and button-holes, substantially as set forth.

5. A pair of overalls comprising a front section having a bib attached thereto, front pockets at each edge of said front section, a facing strip for reinforcing the edge of said bib, which facing strip extends down along the side seams of said front section overlapping the edges of said pockets, and a rear section attached to said front section by side seams terminating at a point below the waist line forming side openings, the bottom of said side openings and the stitches forming the juncture being above the lower ends of said facing strips, whereby said stitches pass through the several thicknesses of the material to form a strong juncture, substantially as set forth.

6. A pair of overalls formed with a bib on the front section said bib being reinforced at its edge by a strip of material stitched thereto which strip of material extends down along the edges of the section below said bib and into the seam forming the juncture between the front and rear sections of the garment, button-holes being formed in said section with the outer ends of said button-holes just inside said reinforcing strip, whereby said button-holes are stayed by said strip, substantially as set forth.

7. A pair of overalls comprising front and rear body sections secured together by side seams terminating a distance below the waist line forming side openings, the front section being reinforced at its edge by a continuous facing strip stitched thereto, the rear section being reinforced at its edges by facing strips stitched thereto, said reinforcing strips of both sections extending below the juncture of the two sections with rows of stitching passing through the several thicknesses of material, pockets at the edges of the front section the edges of which are secured under the facing strips on the edges thereof, pockets on the rear section the outer edges of which are secured to the facing strips on the edges thereof, buttons mounted on the edges of one of said sections, and button-holes formed in the edges of the other section, said buttons and button-holes being stayed by said facing strips, substantially as set forth.

8. A pair of overalls comprising front and rear body sections secured together by side seams, said front section being formed with a waist-band stitched thereto and extending to each edge thereof, said rear section being formed with a corresponding waist-band extending from edge to edge thereof, facing strips reinforcing the edges of said sections and extending over the ends of said waist-bands, buttons secured in the reinforced corners of said rear section, button-holes formed in the reinforced edges of said front section, and appropriate pockets and supports, substantially as set forth.

9. A pair of overalls formed with side openings, a waist-band secured across the top of the rear section, a corresponding waist-band secured across the front section at the corresponding position, an adjusting strap and buckle secured on the rear waist-band by having pieces of goods stitched thereto, suspender buttons mounted on said rear waist-band at the points reinforced by said extra goods, and appropriate pockets and supports, substantially as set forth.

10. A garment of the character described having a bib reinforced on each edge by facing strips extending from a point on the body of the garment within the side openings thereof along the edges of the front of the body, across the line of juncture of the body and bib and along the outer edge of said bib and secured thereto by stitching, substantially as set forth.

11. A garment of the character described comprising a body with a bib on the front part thereof, said body having side openings adjacent to the edges of said bib, the edges of said bib being reinforced by facing strips which extend continuously along the edges of the bib onto the body and along the edges of the body side openings and into the seams at the juncture of the parts at the bottom of said body side openings, substantially as set forth.

12. A garment of the character described having a bib on the front section, a waist-band extending from edge to edge of said front section and secured at the line of juncture of the bib with the body part of the garment, the edges of said bib being reinforced by being inturned, and facing strips secured to the inner face thereof covering said inturned edges and extending continuously from a point within the seam joining the parts at the lower ends of the side openings in the garment along the edges of the front body part and bib and over the ends of said waist-band and being secured in position by continuous stitching, substantially as set forth.

In witness whereof we hereunto set our hands at Detroit, Michigan, this 13th day of March, A. D. 1916.

HAMILTON CARHARTT.
HAMILTON CARHARTT, Jr.
OSCAR E. KRATZ.

Witnesses:
Jas. T. Hurley,
J. R. Rein.